United States Patent [19]

Butler

[11] Patent Number: 5,050,134

[45] Date of Patent: Sep. 17, 1991

[54] POSITION DETERMINING APPARATUS

[75] Inventor: Robert Butler, Milford, Conn.

[73] Assignee: Science Accessories Corp., Stratford, Conn.

[21] Appl. No.: 467,632

[22] Filed: Jan. 19, 1990

[51] Int. Cl.[5] .............................................. G01S 15/00
[52] U.S. Cl. .................................... 367/118; 367/129; 367/907; 178/18
[58] Field of Search .............. 367/907, 129, 118, 188; 178/18, 19; 364/561, 569; 181/0.5

[56] References Cited

U.S. PATENT DOCUMENTS

| | | | |
|---|---|---|---|
| 3,504,334 | 3/1970 | Turnage, Jr. | 367/907 |
| 3,838,212 | 9/1974 | Whetstone et al. | 178/18 |
| 4,012,588 | 3/1977 | Davis et al. | 178/18 |
| 4,124,838 | 11/1978 | Kiss | 367/907 |
| 4,357,672 | 11/1982 | Howells et al. | 364/561 |
| 4,578,674 | 3/1986 | Baker et al. | 367/907 |
| 4,891,474 | 1/1990 | Kelly | 178/18 |

Primary Examiner—Daniel T. Pihulic
Attorney, Agent, or Firm—Martin M. Novack

[57] ABSTRACT

An apparatus and method for determining the position of a movable element. An elongated housing is provided for positioning generally adjacent an edge of an area in which the position of the movable element is to be determined. The housing has a base portion which contains a pair of spaced-apart transducers that are mounted in the surface of the base portion and face the area. An upper body portion of the housing is disposed above the base portion and protrudes in cantilevered fashion toward the area, so that the transducers are recessed from the area beneath the protruding upper body portion of the housing. Circuitry is provided for determining the position of the movable element from the respective transit times of energy propagating in either direction between the movable element and the pair of transducers.

20 Claims, 4 Drawing Sheets

POSITION DETERMINING APPARATUS

BACKGROUND OF THE INVENTION

This invention relates to graphical data apparatus and, more particularly, to an apparatus for determining the position of a movable element in a data area.

Graphical digitizers are conventionally used to input graphical coordinate information, or the like, to a companion system. In a graphical digitizer, wave energy is typically passed between a movable element (such as a stylus or cursor) and transducers located at fixed reference locations. The transit time of the wave energy traveling (in either direction) between the movable element and the reference locations is used in determining the position of the movable element, typically in terms of digital coordinates. A type of graphical digitizer manufactured and sold by the assignee hereof, Science Accessories Corporation, measures the transit time of acoustic or sonic energy propagating through air. One model of such type of digitizer, called a "GRAPHBAR", employs a pair of "point" microphones, having generally circular receptivity patterns, mounted in spaced relation in an elongated generally rectangular housing. The housing or "bar" can be conveniently moved to a position adjacent an area in which the position of a movable element, containing a sound source, is to be digitized. The transit time of sound traveling from the source to each microphone is used, in conjunction with the speed of sound in air and known geometrical relationships, to compute the position of the movable element.

In the described type of digitizer there is a region adjacent the location of the transducers, sometimes referred to as a "dead space", where it is difficult to determine the position of the movable element with sufficient accuracy. This is illustrated in conjunction with FIG. 1 which shows a sonic digitizer that includes a bar 90 in which are mounted a pair of spaced apart microphones 51 and 52. The microphones are mounted near opposite ends of the bar and facing the area 10 to be digitized. [The size and shape of the area 10 is somewhat arbitrary and depends, inter alia, upon the necessary accuracy of the digitizer readings.]The x and y directions are as shown by the axes 59 in the diagram. Consider the points 1 and 2, which are a distance d apart and at respective distances $L_1$ and $L_2$ from microphone 51, and the points 3 and 4 which are also a distance d apart and at respective distances $L_3$ and $L_4$ from microphone 51. Geometrical considerations dictate that the difference $L_4-L_3$ will be greater than the distance $L_2-L_1$ This makes it more difficult to accurately determine the y coordinate location of points near the bar 50. Therefore, a "dead space" 11 [whose specific size and shape are determined by desired accuracy]is typically marked off and not used as part of the area in which the position of the movable element is to be accurately located. The "dead space" can be employed for a function such as menu selection, if needed, which does not require high accuracy in two dimensions.

In addition to the "dead space" being wasted in many applications, the need to mark it off is a nuisance, and the risk of inaccurate measurements in the "dead space", if the movable element enters this area, is problematic.

It is among the objects of the present invention to reduce the problems associated with digitizer "dead space" and to generally improve the efficiency and compactness of digitizer equipment.

SUMMARY OF THE INVENTION

The present invention is directed to an apparatus for determining the position of a movable element. In accordance with an embodiment of the invention, an elongated housing is provided for positioning generally adjacent an edge of an area in which the position of the movable element is to be determined. The housing has a base portion which contains a pair of spaced-apart transducers that are mounted in the surface of the base portion and face said area. An upper body portion of the housing is disposed above the base portion and protrudes in cantilevered fashion toward said area, so that the transducers are recessed from said area beneath the protruding upper body portion of the housing. Means are provided for determining the position of the movable element from the respective transit times of energy propagating in either direction between the movable element and the pair of transducers.

In a form of the disclosed embodiment, the position-determining means comprises electronic circuitry, and at least a portion of the circuitry is contained within the upper body portion. Also, in a form of the disclosed embodiment, an additional transducer is mounted in the recessed region beneath the protruding upper body portion, for pilot purposes. Means are provided for determining the transit time of energy propagating in either direction between the additional transducer and at least one of said pair of spaced-apart transducers. In this form of the invention, the means for determining the position of the movable element is responsive to both the respective transit times of energy propagating in either direction between the movable element and said pair of spaced-apart transducers and the transit time of energy propagating in either direction between the additional transducer and said at least one of said pair of spaced-apart transducers.

The invention has the advantage of making more efficient use of the "dead space" described above, and of providing a more compact digitizer equipment. Also, the configuration of the invention provides an advantageous location for a pilot transducer.

Further features and advantages of the invention will become more readily apparent from the following detailed description when taken in conjunction with the accompanying drawings.

DESCRIPTION OF THE PREFERRED EMBODIMENTS

Figure 1:
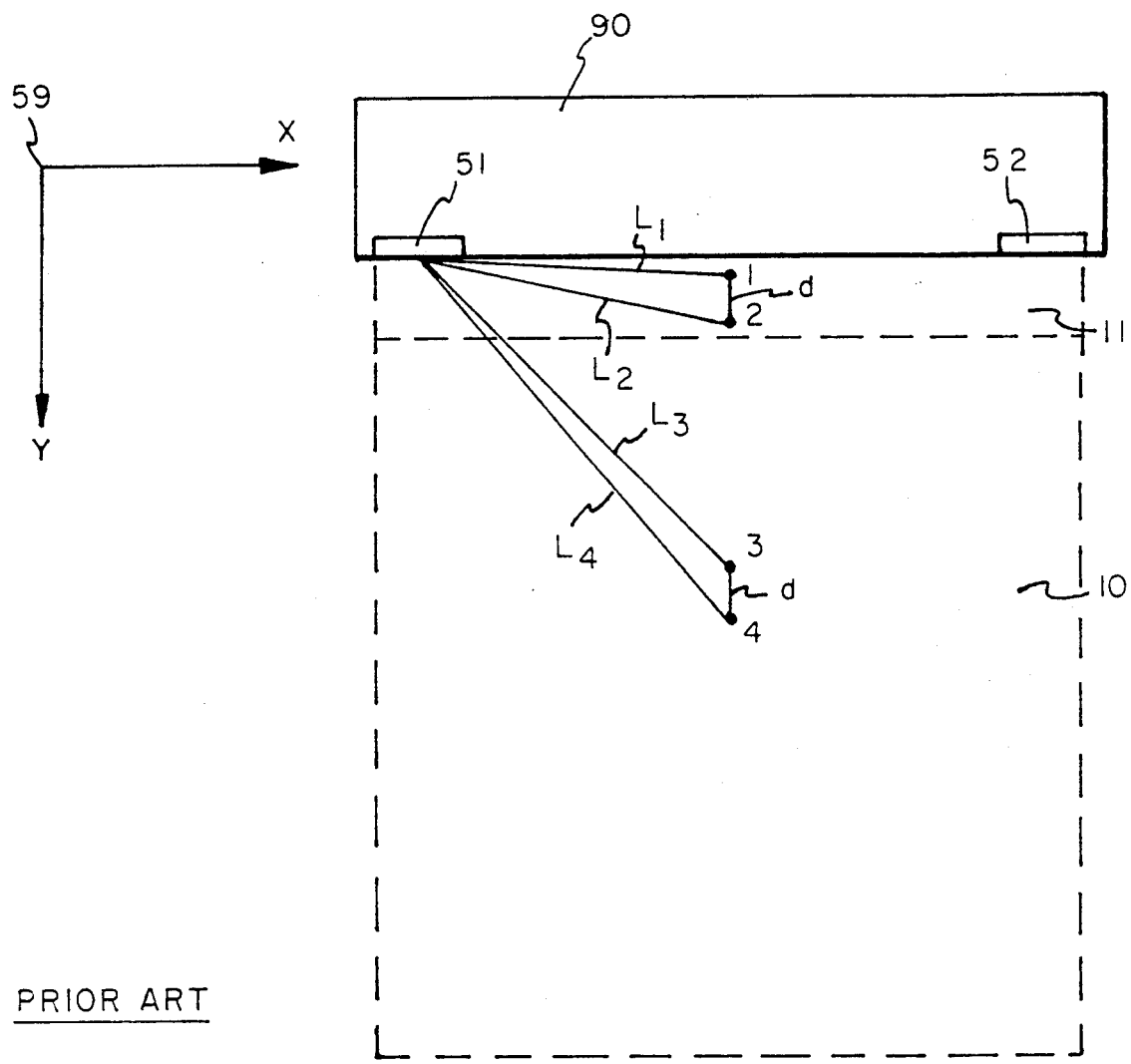
FIG. 1 is a diagram illustrating why the accuracy of position determination is relatively low in a particular area for a certain type of existing digitizer equipment.
Figure 2:
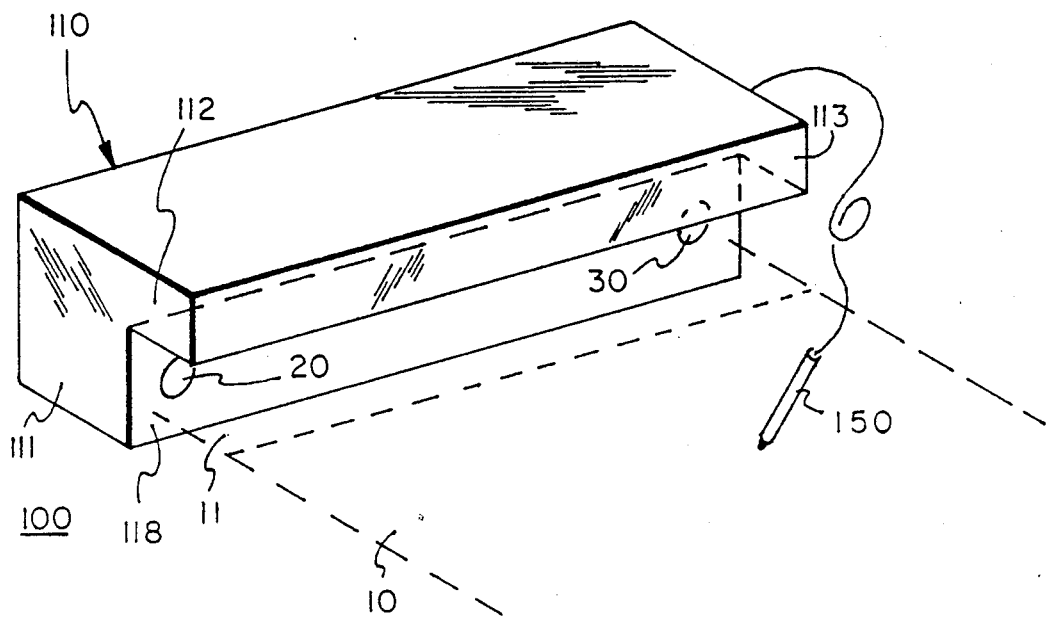
FIG. 2 is an elevational perspective view of an apparatus in accordance with an embodiment of the invention.
Figure 4:
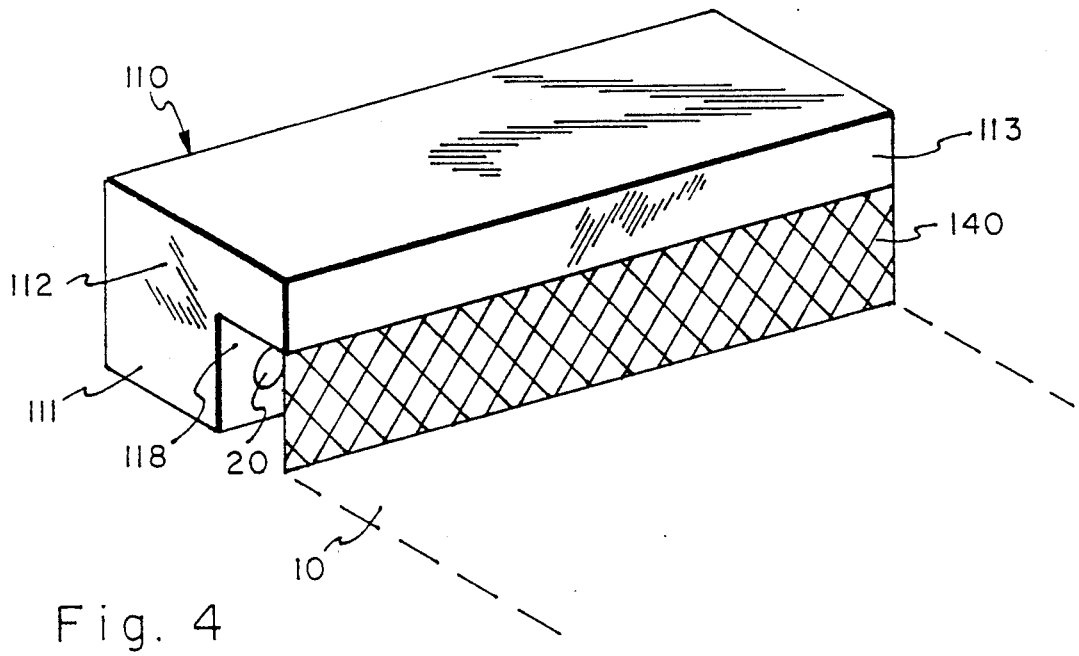
FIG. 4 is an end perspective view of an apparatus in accordance with an embodiment of the invention.

Referring to FIG. 2, there is shown an apparatus in accordance with an embodiment of the invention for determining the position of an element movable in a region located to one side of the apparatus 100 and preferably, although not necessarily, within the dashed region 10. The apparatus includes an elongated housing 110 which is positioned generally adjacent an edge of the region in which the position of a movable element 150 is to be determined. The housing 110 has a base portion 111 which contains a pair of spaced apart transducers 20 and 30 that are mounted in a surface 118 of the base that faces the region 10. The housing 110 has an upper body portion 112 which is disposed above the base portion and which protrudes, in cantilevered fashion, toward the region 10, so that the transducers 20, 30 are recessed, with respect to the region 10, beneath the cantilevered upper body portion 112 of the housing 110. In the present embodiment, the front surface 113 of the upper body portion 112 is approximately above the edge of the region 10. In this manner, if desired, the upper body portion can serve to prevent a suitably configured movable element 150, such as a stylus, pen, finger, cursor, or the like, from entering the area 11 beneath the protruding upper body portion 112. As described in the background portion hereof, the area directly adjacent the transducers in an existing bar-type digitizer is generally not utilized since the determination of position in this area may lack sufficient accuracy. The present invention has the advantage of eliminating the need for marking off a "dead space" adjacent the digitizer apparatus, as well as preventing unintended positioning of the movable element in the "dead space". Further toward this end, and as shown in FIG. 4, a suitable sound-transmitting screen 140 can be provided to enclose part or all of the region beneath the upper body portion 112. The screen may be, for example, of plastic mesh, and will preferably permit free circulation of air.

A further advantage of the present invention is that the upper body portion can, if desired, be utilized to contain a portion of the electronics used in the position determination function. In this manner, the so-called dead space is not wasted, and the housing 110 can have a compact configuration.

Figure 3:
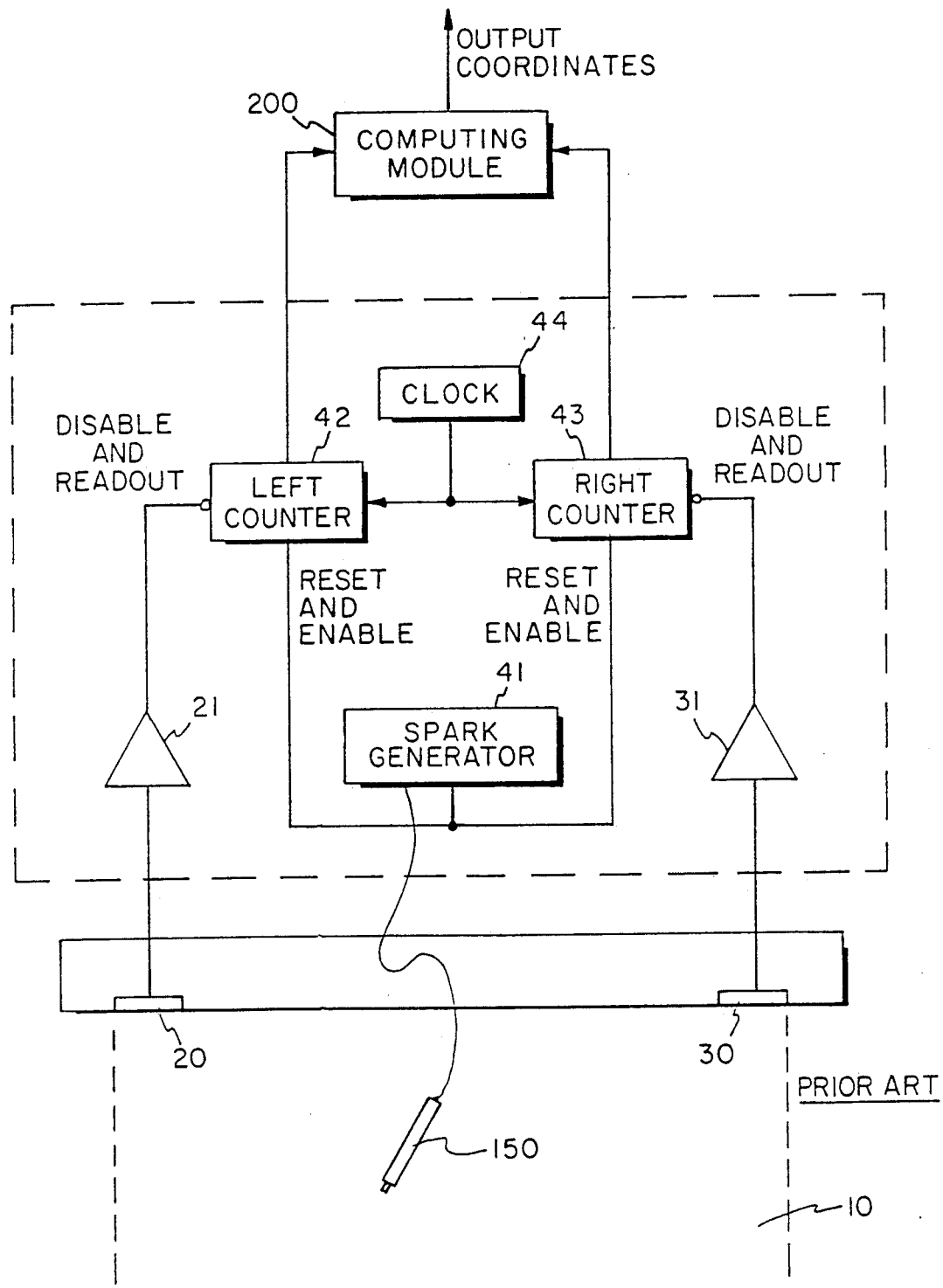
FIG. 3 is schematic diagram, partially in block form, of prior art circuitry which can be utilized in conjunction with an embodiment of the invention.

In one form of the embodiment of FIG. 2, the transducers 20 and 30 are acoustic receivers, such as point microphones, and the movable element 150 is a stylus (or cursor puck, or other suitable device), which contains a transducer for producing acoustic wave energy. The movable element may be, for example, a stylus of the type shown in copending U.S. Pat. application Ser. No. 314,562, now U.S. Pat. No. 4,891,474 and assigned to the same assignee as the present invention. Techniques for determining the position of a movable element sound emitter with respect to a pair of receivers, such as point microphones, are well known in the art, and reference can be made, for example, to U.S. Pat. No. 4,012,588, or to equipment known as Model GP-7 "GRAFBAR" manufactured and sold by Science Accessories Corporation, the assignee hereof. Briefly, however, and as illustrated in FIG. 3, the travel time duration is determined by circuitry 40, shown for convenience in dashed line to the rear of bar 90, which comprises a left counter 42, associated with the left microphone 20, a right counter 43 associated with the right microphone 30, a clock 44, and a spark generator circuit 41. Coincident with generation of the spark at movable element 150, the counters 42 and 43 are enabled by a gating signal from the spark generator circuit to begin counting pulses from clock 44. Upon initial reception of the sound wavefront, the microphones 20 and 30, which generally receive the wavefront at different times, produce output voltages which are coupled to high gain band pass amplifiers 21 and 31, respectively. The spark shock wave produces a fast rise time electrical impulse upon impinging on the microphone surface, and the band pass amplifiers allow only the fast rise time portion of the electrical pulse to pass while blocking out noise signals outside the band. To insure rapid operation, the amplifiers include threshold discriminators which provide an output pulse with a steep leading edge in response to the input thereto exceeding a predetermined level. The amplifier outputs are operative to disable the counters 42 and 43 and also to read out the respective counts which are indicative of the travel times between the sound source on the movable element and the microphones. In this regard, reference can be made to copending U.S. Pat. application Ser. No. 467,662, filed of even date herewith and assigned to the same assignee as the present application. The respective distances can then be computed, in known manner, by multiplying the travel times by the velocity of sound in air. This can be implemented, for example, by computing module 200, or any suitable dedicated or general purpose processor.

Figure 5:
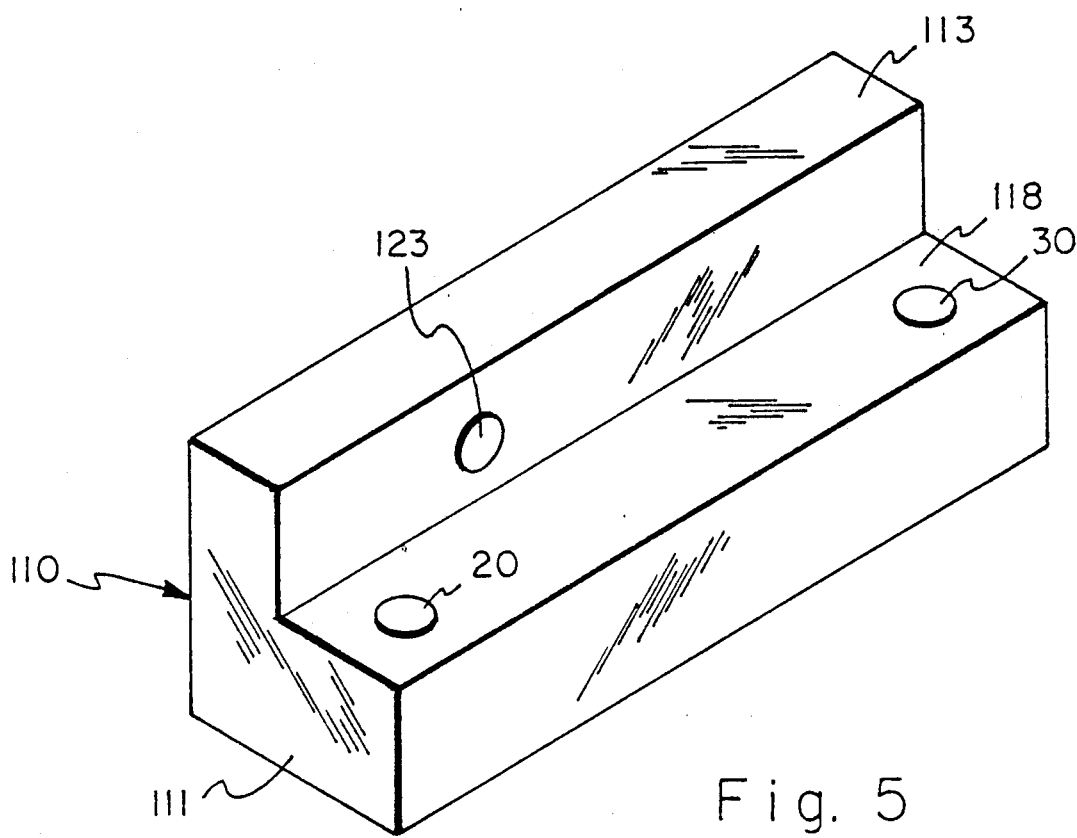
FIG. 5 is a side and bottom perspective view of an apparatus in accordance with an embodiment of the invention.

FIG. 5 illustrates an embodiment of a further feature of the invention which utilizes a third fixed transducer 123 mounted on the housing 110 for the purpose of obtaining a velocity-representative signal that is used in deriving more accurate digitizer position determinations. As is well known in the art, the speed of sound through air varies substantially with the temperature of the air, and acoustic digitizers can utilize a measurement between fixed distances, sometimes called a pilot measurement, to obtain temperature compensated digitizer outputs. The fixed distance can be obtained, for example, by placing the movable element at a known position before taking a pilot measurement. This has the disadvantage of requiring a time-consuming manual operation. Also, since subsequent measurements are taken after significant time has passed, changes in conditions can occur, which would reduce the effectiveness of the pilot measurement. Another known technique is to utilize a second sound source (or receiver, if the fixed transducers are sources) which is at a fixed position with respect to the receivers. However, this gives rise to the problem of where to place the further fixed transducer so that it will not be obtrusive, and so that it will not interfere in any way with operation of the movable element of digitizer. In the FIG. 5 embodiment, a further fixed transducer 123 is positioned on the bottom wall of the protruding upper body portion 112, and this solves the aforementioned problems while, again, making use of the so-called "dead space" and not interfering with normal digitizer operation. In operation, a spark gap can be provided as transducer 123. A spark generator (such as 41) can energize the spark gap 123 and clock pulses (such as from clock 44) are counted by a counter (e.g. 43 coupled to microphone 30) until the counter is disabled by arrival of the sound wavefront at microphone 30. The count represents the transit time of the sound wavefront. The speed of sound in the present air environment can then be computed by dividing the known distance (between fixed source 123 and microphone 30) by the obtained transit time. This speed of sound can then be utilized in the above-referenced distance computations for the movable element. It will be understood that the pilot measurements can be made as frequently as desired.

The embodiment of FIG. 2 was illustrated in terms of a position determining apparatus in which the movable element includes a sound source, and the transducers 20 and 30 are sound receivers. It will be understood, however, that, if desired, either or both of the transducers 20 and/or 30 can be utilized to transmit acoustic energy. In such case, the movable element can be utilized as a receiver, thereby reversing the mode of operation which was first described. As is known in the art, the transmitters can be sequentially energized, and the distance between each transmitter and the receiver in the movable element can be computed in the manner previously described. From this information, and known trigonometric relationships, the position of the movable element can be determined. In a still further variation, the movable element can be a passive reflector of acoustic energy. In this regard, see, for example, U.S. Pat. Nos. 4,012,588 or 4,124,838, assigned to the same assignee as the present application. In such case, one or both of the transducers 30, 40 could be used as a transmitter as well as a receiver. If desired, a separate transmitter can also be employed. It will also be understood that the pilot transducer 123 can be a receiver when the transducers 20 and/or 30 are transmitters.

Figure 6:
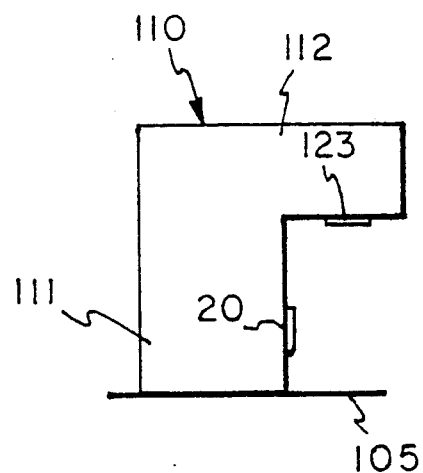
FIG. 6 is an end view of another form of an apparatus in accordance with an embodiment of the invention.

The invention has been described with reference to illustrative preferred embodiments, but variations within the spirit and scope of the invention will occur to those skilled in the art. For example, the shape contours of the housing and the protruding upper body portion can be varied to some degree while retaining the indicated advantages of the invention. Further, additional structure can be provided for support, balance, or other purposes. For example, in FIG. 6 a base panel 105 is provided and, if desired, the front thereof can be used for a menu selection function.

I claim:

1. Apparatus for determining the position of a movable element, comprising:
   an elongated housing for positioning generally adjacent an edge of an area in which the position of the movable element is to be determined, said housing having a base portion which contains a pair of spaced-apart transducers that are mounted in the surface of said base portion and face said area, said housing having an upper body portion which is disposed above said base portion and which protrudes in cantilevered fashion toward said area, so that said transducers are recessed from said area beneath the protruding upper body portion of said housing; and
   means for determining the position of said movable element from the transit times of energy propagating in either direction between said movable element and said transducers.

2. Apparatus as defined by claim 1, wherein said energy is acoustic energy.

3. Apparatus as defined by claim 1, wherein said position-determining means comprises electronic circuitry, at least a portion of which is contained within said upper body portion.

4. Apparatus as defined by claim 2, wherein said position-determining means comprises electronic circuitry, at least a portion of which is contained within said upper body portion.

5. Apparatus as defined by claim 1, further comprising a sound-transmitting screen on the lower front of said housing and covering at least part of the recessed portion thereof.

6. Apparatus as defined by claim 2, further comprising a sound-transmitting screen on the lower front of said housing and covering at least part of the recessed portion thereof.

7. Apparatus as defined by claim 4, further comprising a sound-transmitting screen on the lower front of said housing and covering at least part of the recessed portion thereof.

8. Apparatus as defined by claim 2, wherein said movable element includes a sound emitter, and said transducers are sound receivers.

9. Apparatus as defined by claim 4, wherein said movable element includes a sound emitter, and said transducers are sound receivers.

10. Apparatus as defined by claim 7, wherein said movable element includes a sound emitter, and said transducers are sound receivers.

11. Apparatus as defined by claim 1, further comprising an additional transducer mounted in the recessed region beneath said protruding upper body portion; means for determining the transit time of energy propagating in either direction between said additional transducer and at least one of said pair of spaced-apart transducers; said means for determining the position of said movable element being responsive to both the respective transit times of energy propagating in either direction between said movable element and said pair of spaced-apart transducers and the transit time of energy propagating in either direction between said additional transducer and said at least one of said pair of spaced-apart transducers.

12. Apparatus as defined by claim 2, further comprising an additional transducer mounted in the recessed region beneath said protruding upper body portion; means for determining the transit time of energy Propagating in either direction between said additional transducer and at least one of said pair of spaced-apart transducers; said means for determining the position of said movable element being responsive to both the respective transit times of energy propagating in either direction between said movable element and said pair of spaced-apart transducers and the transit time of energy propagating in either direction between said additional transducer and said at least one of said pair of spaced-apart transducers.

13. Apparatus as defined by claim 4, further comprising an additional transducer mounted in the recessed region beneath said protruding upper body portion; means for determining the transit time of energy propagating in either direction between said additional transducer and at least one of said pair of spaced-apart transducers; said means for determining the position of said movable element being responsive to both the respective transit times of energy propagating in either direction between said movable element and said pair of spaced-apart transducers and the transit time of energy propagating in either direction between said additional transducer and said at least one of said pair of spaced-apart transducers.

14. Apparatus for determining the position of a movable element, comprising:

an elongated housing for positioning generally adjacent an edge of an area in which the position of the movable element is to be determined, said housing having a base portion which contains a pair of spaced-apart microphones that are mounted in the surface of said base portion and face said area, said housing having an upper body portion which is disposed above said base portion and which protrudes in cantilevered fashion toward said area, so that said transducers are recessed from said area beneath the protruding upper body portion of said housing; and an acoustic energy source mounted in said movable element; and means for determining the position of said movable element from the transit times of acoustic energy propagating from the acoustic energy source in said movable element to the respective microphones.

15. Apparatus as defined by claim 14, wherein said position-determining means comprises electronic circuitry, at least a portion of which is contained within said upper body portion.

16. Apparatus as defined by claim 14, further comprising a sound-transmitting screen on the lower front of said housing and covering at least part of the recessed portion thereof.

17. Apparatus as defined by claim 15, further comprising a sound-transmitting screen on the lower front of said housing and covering at least part of the recessed portion thereof.

18. Apparatus as defined by claim 14, further comprising an additional acoustic energy source mounted in the recessed region beneath said protruding upper body portion; means for determining the transit time of acoustic energy propagating from said additional acoustic energy source to at least one of said pair of spaced-apart microphones; said means for determining the position of said movable element being responsive to both the respective transit times of acoustic energy propagating from said acoustic energy source of said movable element to said pair of spaced-apart microphones and the transit time of acoustic energy propagating from said additional acoustic energy source to said at least one of said pair of spaced-apart microphones.

19. Apparatus as defined by claim 15, further comprising an additional acoustic energy source mounted in the recessed region beneath said protruding upper body portion; means for determining the transit time of acoustic energy propagating from said additional acoustic energy source to at least one of said pair of spaced-apart microphones; said means for determining the position of said movable element being responsive to both the respective transit times of acoustic energy propagating from said acoustic energy source of said movable element to said pair of spaced-apart microphones and the transit time of acoustic energy propagating from said additional acoustic energy source to said at least one of said pair of spaced-apart microphones.

20. Apparatus as defined by claim 17, further comprising an additional acoustic energy source mounted in the recessed region beneath said protruding upper body portion; means for determining the transit time of acoustic energy propagating from said additional acoustic energy source to at least one of said pair of spaced-apart microphones; said means for determining the position of said movable element being responsive to both the respective transit times of acoustic energy propagating from said acoustic energy source of said movable element to said pair of spaced-apart microphones and the transit time of acoustic energy propagating from said additional acoustic energy source to said at least one of said pair of spaced-apart microphones.

* * * * *